United States Patent

Maus et al.

[11] Patent Number: 5,768,889
[45] Date of Patent: Jun. 23, 1998

[54] DEVICE FOR CATALYTICALLY CONVERTING EXHAUST GASES IN AN EXHAUST SYSTEM

[75] Inventors: Wolfgang Maus; Rolf Brück, both of Bergisch Gladbach; Carsten Kruse, Lohmar, all of Germany

[73] Assignee: Emitec Gesellschaft fuer Emissions-technologie mbH, Lohmar, Germany

[21] Appl. No.: 825,497

[22] Filed: Mar. 28, 1997

Related U.S. Application Data

[63] Continuation of PCT/EP95/03761 Sep. 22, 1995.
[51] Int. Cl.⁶ .................................................... F01N 3/28
[52] U.S. Cl. .......................... 60/300; 422/171; 422/174
[58] Field of Search ......................... 60/300; 422/171, 422/174

[56] References Cited

U.S. PATENT DOCUMENTS 5,413,767  5/1995  Brewer ............................... 60/300

*Primary Examiner*—Douglas Hart
*Attorney, Agent, or Firm*—Herbert L. Lerner; Laurence A. Greenberg

[57] ABSTRACT

A device for catalytically converting exhaust gases in an exhaust system, especially an exhaust system of an internal combustion engine, preferably for Otto engines, includes at least two honeycomb bodies which are disposed in an outer jacket tube and through which an exhaust gas can flow in succession. The adjacent honeycomb bodies are joined to one another through the use of support elements protruding into the honeycomb bodies. The first honeycomb body is spaced apart relative to the outer jacket tube and has at least two shells joined to a jacket surface of the first honeycomb body, which are each connected to an electrical power lead. Electrically insulating joining elements each have one end joined to a shell and another end joined to the adjacent second honeycomb body. The outer jacket tube has at least one encompassing bead, which rests on a jacket tube of the second adjacent honeycomb body.

22 Claims, 2 Drawing Sheets

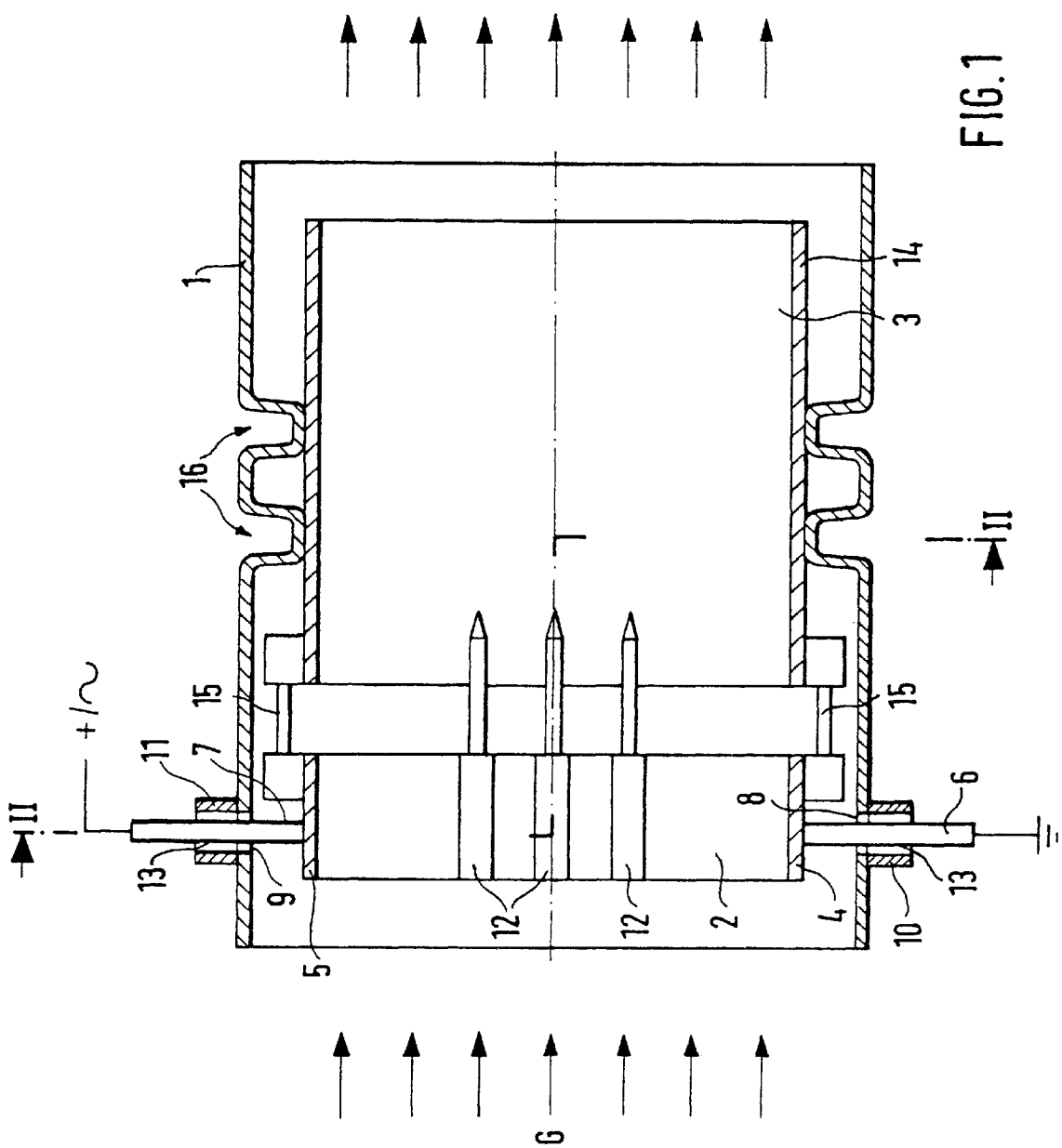

DEVICE FOR CATALYTICALLY CONVERTING EXHAUST GASES IN AN EXHAUST SYSTEM

CROSS-REFERENCE TO RELATED APPLICATION

This application is a Continuation of International Application Ser. No. PCT/EP95/03761, filed Sep. 22, 1995.

BACKGROUND OF THE INVENTION

1. Field of the Invention

The present invention relates to a device for catalytically converting exhaust gases in an exhaust system, especially such a system in an internal combustion engine, preferably for Otto engines, which includes at least one first and one second honeycomb body disposed adjacent one another in a common jacket tube and through which an exhaust gas can flow successively, wherein at least the first electrically heatable honeycomb body, which has at least one flow distributing structure, is disposed in and spaced apart from the outer jacket tube, and the adjacent honeycomb bodies are mechanically joined together by support elements protruding into the honeycomb bodies.

Published International Patent Application WO 92/13636, corresponding to U.S. Pat. No. 5,382,774, discloses a honeycomb body with a plurality of disks braced against one another. The honeycomb body has at least two disks, which are spaced apart from one another and through which exhaust flows in succession. Supports are disposed near a shaft for joining the disks to one another.

However, it proves to be difficult to manufacture such a honeycomb body, since the location of the supports in both parts of the honeycomb body must already be defined accurately beforehand. However, doing so beforehand is problematic since it is relatively difficult to make two honeycomb bodies exactly identical. The reason therefor is especially that the honeycomb bodies include wound sheet-metal layers, and in the winding operation, the exact location where the holder for the supports will be cannot be predicted accurately.

Devices for catalytic conversion of exhaust gases in an exhaust system are also known in which a first and a second honeycomb body are provided, through which a fluid can successively flow. The honeycomb bodies are mechanically joined to one another through the use of support elements that protrude into the honeycomb bodies. In order to achieve the fastest possible catalytic conversion of exhaust gases, one of the honeycomb bodies is electrically heatable. To that end, the honeycomb body has at least two flow distributing structures, joined to the jacket surface of the honeycomb body and each connected to an electrical power lead. Those structures serve to provide a uniform flow distribution. The electrically heatable honeycomb body is joined to a jacket tube with the interposition of an insulating layer. The jacket tube has at least two outward-pointing beads, into which correspondingly formed beads of the flow distributing structures protrude. The structures are provided with outward-protruding pins, which are electrically insulated from the jacket tube. The pins serve as terminals for supplying current to the heatable catalyst. Due to the differing thermal expansion behavior of the various components of the device, the connection point between the pins and the shells is mechanically stressed. In order to reduce that mechanical stress, the flow distributing structures are provided with beads that point outward, and as a result the incident forces are transferred from the structures to the jacket tube. One such device has been described by P. F. Küper and W. Maus et al, in SAE Technical Paper Series 940 465. In the production of such a device, the joining of the support elements to the honeycomb bodies is performed by brazing. During the brazing operation, which is carried out in a brazing furnace, the insulating layer gives off water, since the insulating layer is an absorbent mat. The release of water to the atmosphere in the brazing furnace negatively affects the brazing operation, and therefore only a very small number of devices can be brazed at one time in a brazing furnace.

SUMMARY OF THE INVENTION

It is accordingly an object of the invention to provide a device for catalytically converting exhaust gases in an exhaust system, which overcomes the hereinafore-mentioned disadvantages of the heretofore-known devices of this general type.

With the foregoing and other objects in view there is provided, in accordance with the invention, a device for catalytically converting exhaust gases in an exhaust system, in particular for an exhaust system of an internal combustion engine, preferably for Otto engines, comprising an outer jacket tube; at least one first electrically heatable honeycomb body having a jacket surface and one second honeycomb body, the honeycomb bodies disposed adjacent one another in common in the outer jacket tube for successively conducting an exhaust gas can flow; at least the first honeycomb body disposed in and spaced apart from the outer jacket tube and having at least one flow distributing structure; support elements mechanically joining the adjacent honeycomb bodies together and protruding into the honeycomb bodies; and additional electrically insulating retaining elements each having one end region joined to the jacket surface of the heatable first honeycomb body and another end joined to the adjacent second honeycomb body.

Through the use of this provision, a mechanically stable connection between the heatable first honeycomb body and the adjacent second honeycomb body is achieved. The electrically insulating joining elements absorb the forces dictated by thermal expansion, so that the power leads are not mechanically stressed. Another advantage of this construction is that now it is possible to dispense with an absorbent mat between the electrically heatable honeycomb body and the jacket tube, and as a result the brazing process can be carried out in a manner that is known per se. Many devices can now be brazed simultaneously in a vacuum brazing furnace, without water being able to enter into the brazing furnace atmosphere.

The connecting elements can be brazed to the metal sheets of the honeycomb body, when the honeycomb body is a metal catalyst carrier body.

In accordance with another feature of the invention, the flow distributing structures form a part of the jacket surface of the honeycomb body. The flow distributing structures may be sheet-metal strips. These sheet-metal strips can be joined to at least some of the retaining elements. Joining the retaining elements to the flow distributing structures can be carried out by brazing or welding.

In accordance with a further feature of the invention, the flow distributing structures are constructed in the form of shells. This provides for an advantageous distribution of the flow over the honeycomb body. The flow distributing structure may have a contour adapted to the body.

In accordance with an added feature of the invention, two successive, spaced-apart flow distributing structures form at least a part of the jacket surface of the honeycomb body. In this embodiment, each retaining element is joined to only one flow distributing structure.

In accordance with an additional feature of the invention, the adjacent second honeycomb body is provided with an inner jacket tube and the retaining elements are joined to the inner jacket tube. Joining the inner jacket tube to the retaining elements can be carried out by brazing or welding.

Once the two honeycomb bodies are joined together by the retaining elements and the support elements, they are introduced into the common jacket tube.

In accordance with yet another feature of the invention, the common jacket tube is constructed with at least one encompassing inner bead, so that this inner bead rests on the inner jacket tube of the adjacent honeycomb body. In a device in which the inside diameter of the common jacket tube is constant and the outer diameters of the honeycomb bodies are the same, this inner bead prevents a partial stream of exhaust gas from flowing through the device without also being cleaned.

In accordance with still another feature of the invention, the inner jacket tube of the second honeycomb body is joined to the outer jacket tube in the vicinity of the inner bead.

In accordance with yet a further feature of the invention, the inner bead is constructed in such a way that the joining of the honeycomb bodies to the common jacket tube is carried out by force-locking engagement.

In accordance with yet an added feature of the invention, instead of or in addition to the force-locking joining of the common jacket tube to the honeycomb body, the honeycomb body can be brazed or welded to the common jacket tube in the a region of the inner bead. In the case of a brazed connection, the jacket tube of the honeycomb body can be at least partially coated with a brazing material.

The formation of the inner beads in the common jacket tube can be carried out before the honeycomb bodies are introduced into the common jacket tube. However, it is practical for the inner beads not to be formed until the honeycomb bodies are disposed in the common jacket tube. This makes it easier to bind the power leads to the flow distributing structures, since the honeycomb bodies are displaceable not only axially but also radially.

In accordance with yet an additional feature of the invention, the inner bead can be made by rolling or swaging, especially rotary swaging. In order to minimize relative expansion, it is advantageously placed near the end surface of the second honeycomb body that is toward the first honeycomb body.

In accordance with again another feature of the invention, in order to assure electrical decoupling of the electrically heatable honeycomb body from the adjacent second honeycomb body, each retaining and/or support element has a first and spaced apart from it a second tube surrounding the respective end region of a pin. An insulating layer is provided between the tubes and the pin. This embodiment is advantageous since it provides double insulation.

In accordance with again a further feature of the invention, there is provided an electrically insulating layer disposed on the end surface of the pin, which can additionally prevent a voltage sparkover between the pin and the honeycomb body.

In accordance with a concomitant feature of the invention, the support elements and/or the retaining elements have end surfaces, and there are provided electrically insulating layers each disposed on a respective one of the end surfaces of the support elements and of the retaining elements.

Other features which are considered as characteristic for the invention are set forth in the appended claims.

Although the invention is illustrated and described herein as embodied in a device for catalytically converting exhaust gases in an exhaust system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, longitudinal-sectional view of a, device for catalytic conversion of exhaust gas;

DESCRIPTION OF THE PREFERRED EMBODIMENTS

Figure 2:
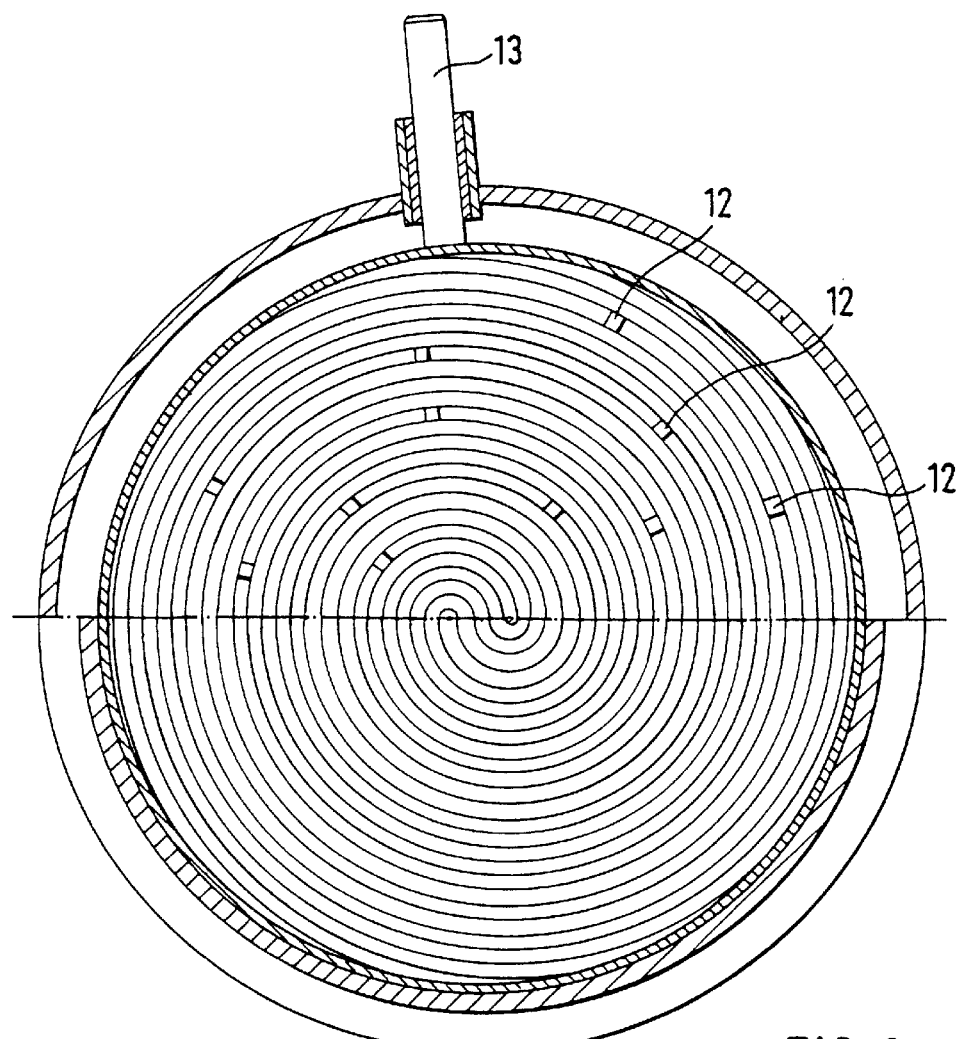
FIG. 2 is cross-sectional view of the device taken along a line II—II of FIG. 1, in the direction of the arrows.

Referring now to the figures of the drawings in detail and first, particularly, to FIGS. 1 and 2 thereof, there is seen a preferred exemplary embodiment of a device for catalytically converting exhaust gases in an exhaust system. The device includes first and second honeycomb bodies 2, 3, disposed in a common jacket tube 1, through which an exhaust gas G can successively flow. The first honeycomb body 2 is disposed in and spaced apart from the common jacket tube 1 and is electrically heatable. An outer jacket surface of the first honeycomb body 2 is formed by two flow distributing structures 4, 5 in the form of shells. The structures 4, 5 are each connected to an electrical power lead 6, 7. The power leads 6, 7 protrude to the outside through openings 8, 9 formed in the common jacket tube 1. The power lead elements 6, 7 pass through connecting pieces 10, 11, which are welded to the common jacket tube 1. The connecting pieces 10, 11 have an insulating layer 13, so that the power leads 6, 7 are electrically insulated from the common jacket tube 1.

The two honeycomb bodies 2, 3 are joined together through the use of support elements 12 that protrude into the honeycomb bodies. For the sake of greater clarity, only three of a multiplicity of possible support elements are shown herein, by way of example.

The honeycomb body 3 has an inner jacket tube 14. The respective flow distributing structures 4 and 5 are joined to the inner jacket tube 14 of the honeycomb body 3 through the use of additional retaining elements 15.

Two encompassing inner beads 16 are formed in the common jacket tube 1. The inner beads 16 are constructed in such a way that they come to rest against the inner jacket tube 14 of the honeycomb body 3. A material connection can exist at surfaces that touch one another between the bead 16 and the inner jacket tube 14.

The inner bead 16 is advantageously formed relatively close to the electrically heatable honeycomb body 2, which averts excessive relative expansion.

Figure 3:
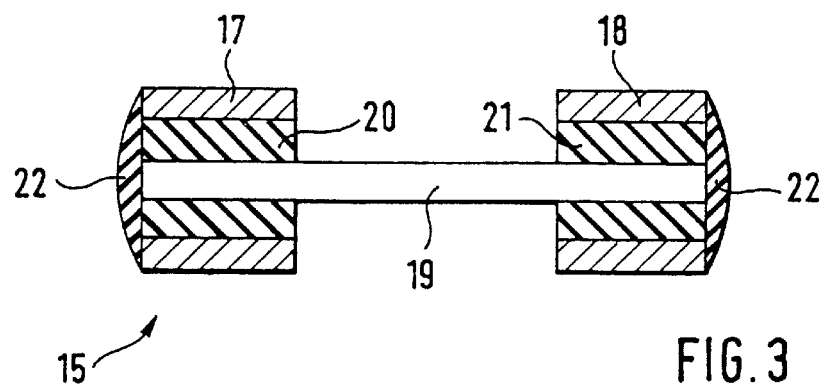
FIG. 3 is an enlarged, longitudinal-sectional view of a joining element.

FIG. 3 shows a longitudinal section through a retaining element 15. The retaining element 15 includes a first tube 17 and a second tube 18 spaced apart therefrom, which fit around respective end regions of a pin 19. Insulating layers 20 and 21 are each formed between a respective one of the tubes 17 and 18 on one hand, and the pin 19 on the other hand, so that the pin 19 itself is potential-free even if voltages are applied to the tubes 17, 18. The electrical breakdown resistance of the support element is doubled as compared with those that have uninterrupted tubes. The retaining elements 15 and the support elements 12 can be constructed identically.

This reduces the number of parts required in making the device. The electrical separation of the honeycomb bodies from one another is improved by the use of identical retaining and support elements. The illustration in FIG. 3 shows one possible embodiment of a support element. As can be seen from FIG. 3, an electrically insulating layer 22 can additionally be formed on the end surface of the pin 19. Instead of providing only the end surface of the pin with an electrically insulating layer 22, it is possible to provide the entire end surface of the element 15 with such a layer. To that end, end surfaces of the retaining and support elements can be dipped into a composition that is electrically insulating, for instance, and the composition on the end surfaces remains stable after drying and at high temperatures.

The double electrical insulation can be omitted if there is no need to fear an electrical short circuit, because of the way in which the joining elements are disposed or the electrical properties of the honeycomb body 3.

The device for catalytically converting exhaust gases is produced in such a way that first the two honeycomb bodies 2, 3 are joined together by the support elements 12 and the retaining elements 15 to make a structural unit. Next, the structural unit is introduced into the common jacket tube 1, and the power leads 6 and 7 are joined together with the flow distributing structures 4, 5, especially by welding. The connecting pieces 10, 11 can be joined to the common jacket tube 1 at the same time by welding. The inner beads 16 are then made in the common jacket tube 1.

The device which is thus prepared can be placed in a vacuum brazing furnace, in which the common jacket tube 1 is joined to the inner jacket tube 14. To that end, the inner jacket tube 14 has been coated with a brazing material, in a preparatory work step. Once the brazing operation has been performed, the device can be taken for final processing.

We claim:

1. A device for catalytically converting exhaust gases in an exhaust system, comprising:
   an outer jacket tube;
   at least one first electrically heatable honeycomb body having a jacket surface and one second honeycomb body, said honeycomb bodies disposed adjacent one another in common in said outer jacket tube for successively conducting an exhaust gas can flow;
   at least said first honeycomb body disposed in and spaced apart from said outer jacket tube and having at least one flow distributing structure;
   support elements mechanically joining said adjacent honeycomb bodies together and protruding into said honeycomb bodies; and
   additional electrically insulating retaining elements each having one end region joined to said jacket surface of said heatable first honeycomb body and another end joined to said adjacent second honeycomb body.

2. The device according to claim 1, wherein said at least one flow distributing structure forms a part of said jacket surface of said first honeycomb body, and at least some of said retaining elements are joined to said at least one flow distributing structure.

3. The device according to claim 1, wherein said at least one flow distributing structure is shell-shaped.

4. The device according to claim 1, wherein said at least one flow distributing structure is two spaced-apart, successive flow distributing structures forming at least a part of said jacket surface of said first honeycomb body, and each of said retaining elements is joined to only one of said flow distributing structures.

5. The device according to claim 1, wherein said second honeycomb body has an inner jacket tube to which each of said retaining elements is joined.

6. The device according to claim 5, wherein said outer jacket tube has at least one encompassing inner bead resting on said inner jacket tube of said second honeycomb body.

7. The device according to claim 6, wherein said inner bead is produced by rolling.

8. The device according to claim 6, wherein said inner bead is produced by swaging.

9. The device according to claim 6, wherein said inner jacket tube of said second honeycomb body is joined to said outer jacket tube in the vicinity of said inner bead.

10. The device according to claim 9, wherein said inner jacket tube of said second honeycomb body is force-lockingly joined to said outer jacket tube in the vicinity of said inner bead.

11. The device according to claim 9, wherein said inner jacket tube of said second honeycomb body is brazed to said outer jacket tube in the vicinity of said inner bead.

12. The device according to claim 9, wherein said jacket tube of said second honeycomb body is welded to said outer jacket tube in the vicinity of said inner bead.

13. The device according to claim 1, wherein each of said support elements and said retaining elements includes a pin having end regions, first and second tubes each surrounding a respective one of said end regions of said pin, and insulating layers each disposed between a respective one of said tubes and said pin.

14. The device according to claim 1, wherein each of said support elements includes a pin having end regions, first and second tubes each surrounding a respective one of said end regions of said pin, and insulating layers each disposed between a respective one of said tubes and said pin.

15. The device according to claim 1, wherein each of said retaining elements includes a pin having end regions, first and second tubes each surrounding a respective one of said end regions of said pin, and insulating layers each disposed between a respective one of said tubes and said pin.

16. The device according to claim 13, wherein said end regions of said pin have surfaces, and said electrically insulating layers are each disposed on a respective one of said end surfaces.

17. The device according to claim 14, wherein said end regions of said pin have surfaces, and said electrically insulating layers are each disposed on a respective one of said end surfaces.

18. The device according to claim 15, wherein said end regions of said pin have surfaces, and said electrically insulating layers are each disposed on a respective one of said end surfaces.

19. The device according to claim 13, wherein said support elements and said retaining elements have end surfaces, and including electrically insulating layers each disposed on a respective one of said end surfaces of said support elements and of said retaining elements.

20. The device according to claim 14, wherein said support elements have end surfaces, and including electrically insulating layers each disposed on a respective one of said end surfaces of said support elements.

21. The device according to claim 15, wherein said retaining elements have end surfaces, and including electrically insulating layers each disposed on a respective one of said end surfaces of said retaining elements.

22. A device for catalytically converting exhaust gases in an exhaust system of an internal combustion engine, comprising:

an outer jacket tube;

at least one first electrically heatable honeycomb body having a jacket surface and one second honeycomb body, said honeycomb bodies disposed adjacent one another in common in said outer jacket tube for successively conducting an exhaust gas can flow;

at least said first honeycomb body disposed in and spaced apart from said outer jacket tube and having at least one flow distributing structure;

support elements mechanically joining said adjacent honeycomb bodies together and protruding into said honeycomb bodies; and additional electrically insulating retaining elements each having one end region joined to said jacket surface of said heatable first honeycomb body and another end joined, to said adjacent second honeycomb body.

\* \* \* \* \*

UNITED STATES PATENT AND TRADEMARK OFFICE
CERTIFICATE OF CORRECTION

PATENT NO. : 5,768,889
DATED : June 23, 1998
INVENTOR(S) : Maus et al.

It is certified that error appears in the above-identified patent and that said Letters Patent is hereby corrected as shown below:

Title page,

[30]   Foreign Application Priority Data
September 28, 1994                              P 44 34 673.5

Signed and Sealed this

Twenty-first Day of May, 2002

Attest:

Attesting Officer

JAMES E. ROGAN
Director of the United States Patent and Trademark Office